United States Patent
Huang

(10) Patent No.: US 11,530,741 B2
(45) Date of Patent: Dec. 20, 2022

(54) POWER SPLIT AND VARIABLE CREEP DRIVE SYSTEM FOR STREET SWEEPER OR LIKE SPECIALTY VEHICLE

(71) Applicant: Federal Signal Corporation, Oak Brook, IL (US)

(72) Inventor: Xiaolun Huang, Naperville, IL (US)

(73) Assignee: Federal Signal Corporation, Oak Brook, IL (US)

( * ) Notice: Subject to any disclaimer, the term of this patent is extended or adjusted under 35 U.S.C. 154(b) by 190 days.

(21) Appl. No.: 17/087,047

(22) Filed: Nov. 2, 2020

(65) Prior Publication Data

US 2021/0048093 A1 Feb. 18, 2021

Related U.S. Application Data

(63) Continuation of application No. 15/853,225, filed on Dec. 22, 2017, now Pat. No. 10,844,942.

(60) Provisional application No. 62/443,409, filed on Jan. 6, 2017.

(51) Int. Cl.

| | |
|---|---|
| *F16H 47/04* | (2006.01) |
| *E01H 1/05* | (2006.01) |
| *F16H 61/00* | (2006.01) |
| *B60K 25/06* | (2006.01) |
| *B60W 10/30* | (2006.01) |
| *F16H 37/06* | (2006.01) |
| *F16H 61/4061* | (2010.01) |

(Continued)

(52) U.S. Cl.
CPC .............. *F16H 47/04* (2013.01); *B60K 17/28* (2013.01); *B60K 25/06* (2013.01); *B60W 10/30* (2013.01); *E01H 1/05* (2013.01); *F16H 37/06* (2013.01); *F16H 61/0009* (2013.01); *F16H 61/4061* (2013.01); *F16H 61/421* (2013.01); *F16H 2200/20* (2013.01)

(58) Field of Classification Search
CPC ........ F16H 47/04; F16H 37/06; F16H 37/065; F16H 61/0009; F16H 61/421; F16H 61/425; F16H 1/28; F16H 3/721; F16H 2200/20; E01H 1/05; B60W 10/30; B60W 30/1888; B60W 30/188; B60K 17/04; B60K 17/28; B60K 25/06; B60K 2025/065

See application file for complete search history.

(56) References Cited

U.S. PATENT DOCUMENTS

| | | | |
|---|---|---|---|
| 4,126,994 A | 11/1978 | Rockwell | |
| 4,291,592 A * | 9/1981 | Meyerle | F16H 47/04 475/81 |
| 4,554,992 A | 11/1985 | Kassai | |

(Continued)

*Primary Examiner* — Steve Clemmons
(74) *Attorney, Agent, or Firm* — Merchant & Gould P.C.

(57) ABSTRACT

A power split and creep drive system for street sweeper or like specialty vehicle having a single engine is disclosed. The system intends to retrofit and convert on-highway truck chassis into specialty vehicles capable of performing work function and moving at creeping speed, such as a street sweeper. It includes a hydraulic work circuit or power-take-off (PTO) port, a planetary gear set, a hydraulic system comprising pumps and motors to drive the working devices and balance the demand between propulsion and work function such as sweeping. The planetary gear set includes an input shaft connecting to a transmission output shaft of the chassis, a first output shaft connecting to a hydraulic machine, and a second output shaft to vehicle propulsion drive shaft.

14 Claims, 3 Drawing Sheets

(51) Int. Cl.
*B60K 17/28* (2006.01)
*F16H 61/421* (2010.01)

(56) References Cited

U.S. PATENT DOCUMENTS

| | | | |
|---|---|---|---|
| 5,335,750 | A | 8/1994 | Geringer et al. |
| 6,073,720 | A | 6/2000 | Vanderlinden |
| 6,615,443 | B2 | 9/2003 | Otsuni et al. |
| 6,663,527 | B2 | 12/2003 | Phelan et al. |
| 6,948,213 | B2 | 9/2005 | Kim |
| 7,261,663 | B2 | 8/2007 | Miller et al. |
| 8,424,630 | B2 | 4/2013 | Lenton |
| 8,622,859 | B2 * | 1/2014 | Babbitt ............... B60K 6/12 |
| | | | 475/72 |
| 8,678,967 | B2 | 3/2014 | Reimann et al. |
| 8,915,327 | B2 * | 12/2014 | Brooker ............. B60W 10/30 |
| | | | 180/305 |
| 2008/0264189 | A1 | 10/2008 | Hancock |
| 2010/0275725 | A1 | 11/2010 | Tolksdorf et al. |

\* cited by examiner

POWER SPLIT AND VARIABLE CREEP DRIVE SYSTEM FOR STREET SWEEPER OR LIKE SPECIALTY VEHICLE

CROSS REFERENCE TO RELATED APPLICATIONS

This application is a continuation application of U.S. patent application Ser. No. 15/853,225, filed Dec. 22, 2017, which claims the benefit of U.S. Patent Application Ser. No. 62/443,406, titled POWER SPLIT AND VARIABLE CREEP DRIVE SYSTEM FOR STREET SWEEPER OR LIKE SPECIALTY VEHICLE, filed Jan. 6, 2017; each of these applications being incorporated herein by reference in their entireties.

TECHNICAL FIELD

The present disclosure related to a vehicle power management and creeping drive system and more particularly for a street sweeper or like specialty vehicle to split power from one engine source between work function and vehicle propulsion, and provide an efficient variable speed transmission for creep drive at the meantime.

BACKGROUND

Street sweepers or like specialty vehicles typically require power to drive work equipment, such as fans, brooms, water pumps, conveyors, etc., while travel at creeping speed (0 to 3 miles per hour) or very low speed (5 to 10 miles per hour). On the other hand, these vehicles are also demanded to travel at high speed (over 50 miles per hour) for job site changing, water refilling or debris dumping. One known approach is to mount an equipment body onto a commercial on-highway truck chassis to convert it into a specialty vehicle, such as a street sweeper. Apparently it is desirable if the chassis internal combustion engine (ICE) power can be shared between work equipment and propulsion. But the significant difference between power demands from the work equipment and vehicle propulsion makes the power split very challenging. In a 'work' (such as sweep) mode, the vehicle needs to move slowly, which requires lower engine speed; meanwhile, work equipment runs at full power, which means higher engine speed. To meet with such opposite demands it often leads to add an auxiliary engine dedicated for sweeping or like work functions. Today dual engines are still most popular option in truck-mounted street sweepers. Even so, it is still hard to satisfy some special needs such as street sweepers, because a commercial on-highway chassis is not quite capable of creeping drive without heavily depending on brake assistance.

SUMMARY

It is desirable to have a new device able to retrofit and convert a common on-highway truck chassis to a specialty vehicle such as a street sweeper at lower cost, less modification and higher fuel-efficiency. Therefore, the power split and variable speed transmission which can more efficiently distribute power between work equipment and vehicle propulsion functions of the present disclosure is very beneficial. This is particularly so because the disclosed system provides variable speed creep drive capabilities at a relative lower vehicle cost.

Accordingly, one aspect of the present disclosure is a power split drive system with variable transmission particularly suitable for a single engine street sweeper or like specialty vehicle.

Another aspect of the present disclosure is a more efficient solution to retrofit and convert a commercial on-highway truck chassis to a street sweeper or like specialty vehicle without adding auxiliary engine.

Another aspect of the present disclosure is to provide an alternative method to propel street sweeper or like specialty vehicle at creep speed without using hydraulic motor.

Another aspect of the present disclosure is to provide a more efficient approach to split power between work equipments and vehicle propulsion and create a variable transmission at the same time with less energy waste.

In accordance with the above, an example of the present disclosure receives power from the chassis engine and distributes it between a variable displacement hydraulic pump at a hydraulic work circuit or power-take-off (PTO) port for the work equipment and the vehicle driveline. The vehicle PTO shaft can connect to the input directly or through a set of typical gear arrangement to achieve a more desirable rotational speed. In a preferred form, the torque split is achieved through a planetary gear set, in which the ring gear is as input, the sun gear as first output connecting to a hydraulic machine and the carrier as second output connecting to driveline, respectively. The hydraulic machine is routed to provide additional hydraulic power to the work equipment in a work mode. At given pressure, changing the displacement of the hydraulic machine will change its torque. Thus, similar to changing the engine throttle pedal, the second output speed, i.e. the driveline speed, will be varied by changing the torque at the first output shaft, thanks to the well-known torque split and speed adder characteristic from planetary gear set.

It is notable that the hydraulic machine in this disclosure operates as a pump only in the drive mode. Such a propulsion approach appears more direct and efficient.

Another feature of the present disclosure is that the power split drive system with variable transmission can be inserted into the chassis drive line. This configuration allows for a retrofit solution that is less chassis-dependent, simpler, and lower costs for converting a common truck chassis to be a single engine sweeper, or like specialty vehicle.

DETAILED DESCRIPTION

In general terms, a power split and creep drive system for a street sweeper or like specialty vehicle having a single engine is disclosed. The system can be used to retrofit and convert an on-highway truck chassis into a specialty vehicle capable of simultaneously performing work functions and moving at creeping speed. A street sweeper is an example of such a specialty vehicle, wherein the vehicle can be placed in a creep mode to drive at 0 to 5 miles per hour and power a sweeping system via the same engine. In one aspect, the power split and creep drive system includes a hydraulic work circuit or power-take-off (PTO) port, a planetary gear set, and a hydraulic system comprising pumps and motors to drive the working devices and balance the demand between propulsion and work function, such as sweeping. In one example, the planetary gear set includes an input shaft connecting to a transmission output shaft of the chassis, a first output shaft connecting to a hydraulic machine, and a second output shaft to vehicle propulsion drive shaft. During creep drive mode, the hydraulic machine is substantially a pump and the vehicle is not driven by the hydraulic machine. Instead, the vehicle is mechanically driven by the vehicle engine through the planetary gear set. Controlling the torque in the first output shaft will cause the torque distribution between the input and second output shafts to be distributed one way or the other such that desired rotational speeds can be achieved. Since the chassis engine will power both the propulsion driveline and pumps for work functions through gears at the same time, it will be more compact and efficient. This system is especially suitable for retrofitting and converting an on-highway truck chassis to a street sweeper or a like specialty vehicle where only a single engine is available to split power between work functions and vehicle propulsion at variable creeping speeds. The following is a detailed description of the disclosed system.

Figure 1:
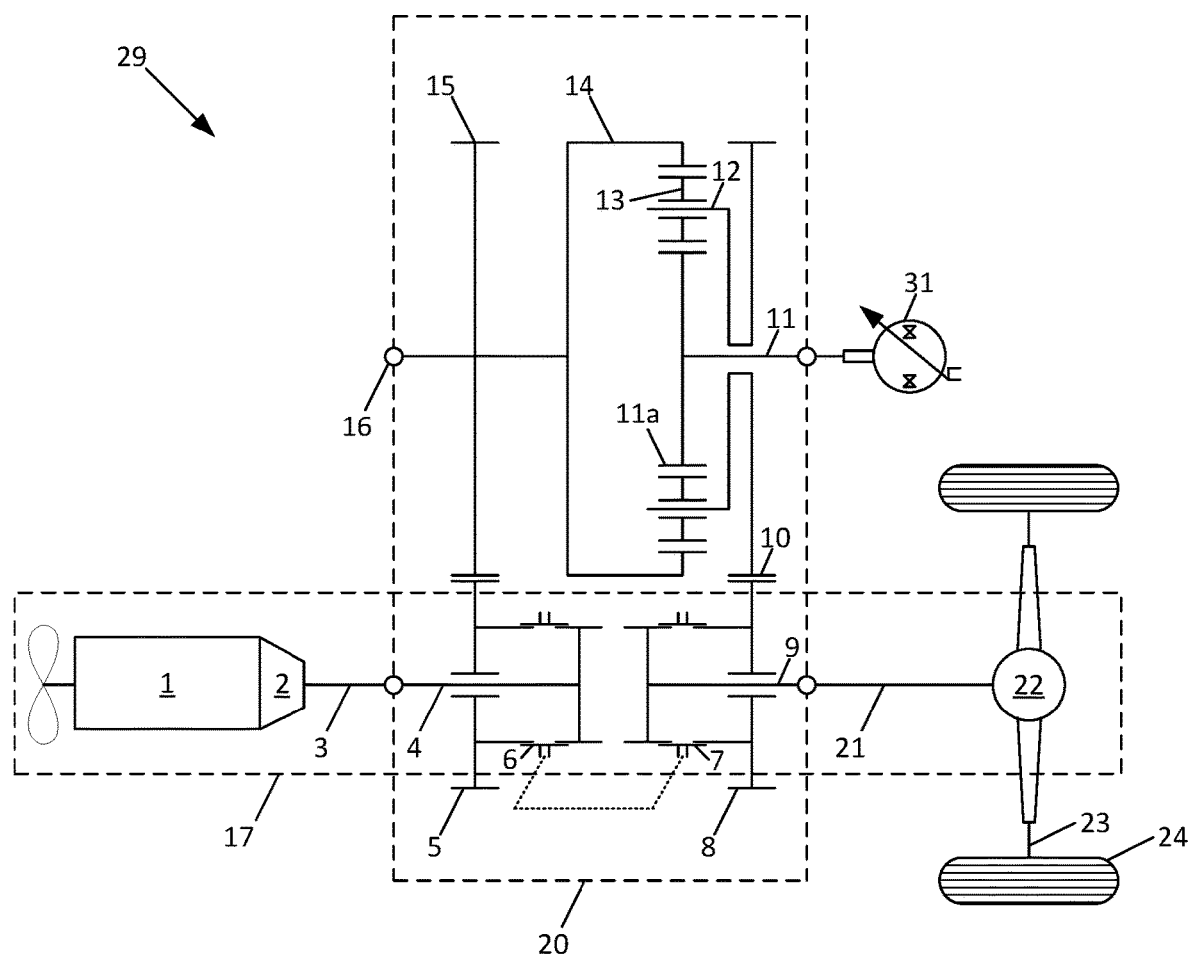
FIG. 1 is a schematic representation of a vehicle having a power split system with variable transmission in accordance with the present disclosure, with the power split system being placed in a work or creep mode.

Referring to FIG. 1, an embodiment of the present disclosure for a single engine street sweeper or like specialty vehicle retrofitted from an on-highway truck chassis is generally presented by the number 29. An on-highway truck chassis assembly 17 will typically include an engine 1, transmission 2, driveline 3 and 21, axle reducer 22, axle 23 and wheels 24. The present disclosure includes a power split and variable speed creep drive (PS-VSCD) device 20 to be inserted between drive shafts 3 and 21. Device 20 provides a shaft output 16 to power work equipment via the hydraulic circuit shown at FIGS. 2, 2A, output shaft 9 to vehicle driveline, and output shaft 11 to hydraulic machine 31 for speed control during 'work (sweep)' mode.

Figure 1A:
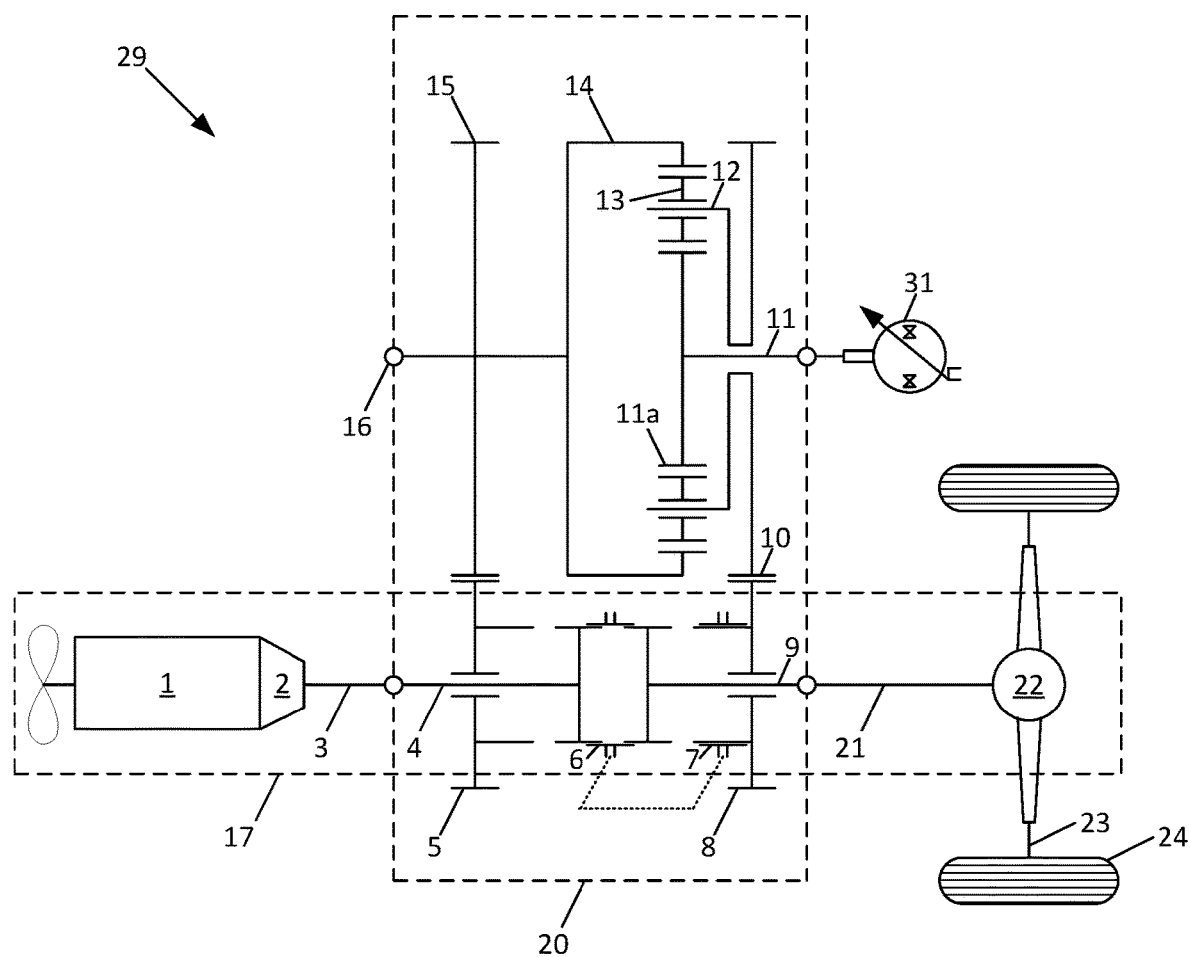
FIG. 1A is a schematic representation of a vehicle having a power split system with variable transmission of FIG. 1, with the power split system being placed in a drive mode.

As shown, the PS-VSCD device 20 includes at least one planetary gear set. A preferred arrangement consists of two couplers 6 and 7 to transfer between a 'creep drive' or 'work (sweep)' mode, as shown at FIG. 1, and a 'transport' or 'drive' mode, as shown at FIG. 1A. At 'work (sweep)' mode, both couplers 6 and 7 are shifted to left which causes the input shaft 4 to connect to ring gear 14 via gears 5 and 15 and output shaft 9 will connect to carrier 12 via gears 8 and 10, respectively. In the creep drive or work mode, the shaft output 16 will also be engaged along with gear 15. This arrangement is shown at FIG. 1.

Shifting both couplers 6 and 7 to the right will convert the vehicle to a 'drive' or 'transport' mode. As coupler 6 shifted right, input shaft 4 will be separated from gear 5 and connected directly to output shaft 9. As coupler 7 shifted right, gear 8 is also no longer engaged with output shaft 9. This arrangement is shown at FIG. 1A. Accordingly, in this mode, the planetary gear set and output shaft 16 will be cut off from the power stream from the engine 1. In essence, the transport mode is simply a restoration of the original chassis configuration in which the engine drives the differential 22 via shafts 3 and 21. The following description will focus on the implementation and operation of the work mode.

To better understand the choice of the device configuration, two important kinematic formulas for a planetary gear set should be understood. The first is the speed adder rule:

$$n_c = An_r + Bn_s \tag{1}$$

where $n_c$, $n_s$ and $n_r$ are angular speeds of the carrier, sun gear and ring gear, respectively, and $$A = \alpha/(1+\alpha), B = 1/(1+\alpha), \alpha = Z_r/Z_s \tag{2}$$

where Zr and Zs are teeth numbers of the ring gear and sun gear, respectively.

It is easy to see that from Equation (1) that the carrier speed $n_c$ can be zero when $$n_s = -(A/B)n_r = -\alpha n_r$$

In such a situation the driveline will not rotate and the vehicle will not be propelled.

The second kinematic rule is called the torque splitter rule:

$$T_r = -AT_c \tag{3}$$

$$T_s = -BT_c \tag{4}$$

$$T_r/T_s = \alpha \tag{5}$$

where $T_c$, $T_r$ and $T_s$ are respective torques in the carrier, ring gear and sun gear, respectively. Note that ring gear is larger than sun gear such that ratio $\alpha > 1$. Thus Equation (2) leads to A<1, B<1 and A>B.

With the above introduction, we now turn to select a preferable configuration for a given application. In one configuration, it is desirable to have highest torque ratio between the second output shaft 9 and the first output shaft 11, so that the demand for the size of hydraulic machine 31 at the first output shaft 11 will be smallest for a given driveline torque requirement. One can find out the following maximum ratio from Equations. (3) to (5), $$|T_c/T_s| = 1 + \alpha \tag{6}$$

From the above equations it can be concluded that an optimized configuration can be: the ring gear 14 as input, the sun gear 11a as first output and carrier 12 as second output. In such a configuration, the torque ratio from input to second output (driveline) is equal to 1/A or (1+1/$\alpha$), and the torque ration from input to first output is $\alpha$.

Now the description turns to how the power split and creep drive work in the present disclosure. In a first step, the chassis system 29 is made ready for the 'work (sweep) mode', which generally means shifting the transmission 2 to a desirable gear and letting the engine 1 run at a pre-selected rotational speed. The choice of such a speed is to allow the chassis engine 1, torque convertor, and transmission 2 to work at their desirable ranges to satisfy the minimum requirement of work (sweeping) functions on power demands. For a typical chassis with an automatic transmission, such a status can be quite easily achieved by programming.

After the vehicle has been readied for the work mode, the couplers 6 and 7 are shifted to place the system into the 'work (sweep) mode.' As shown in FIG. 1, shifting the couplers 6, 7 will cause the transmission output 3 to reach gear 15 via shaft 4, coupler 6 and gear 5. Then engine power will split into two paths: left to PTO 16 and right to the ring gear 14 of planetary gear set. As the PTO portion is straightforward and well understood by those skilled in the art, the primary focus of the disclosure is the creep drive mechanism at the right-hand-side of the schematic.

Figure 2:
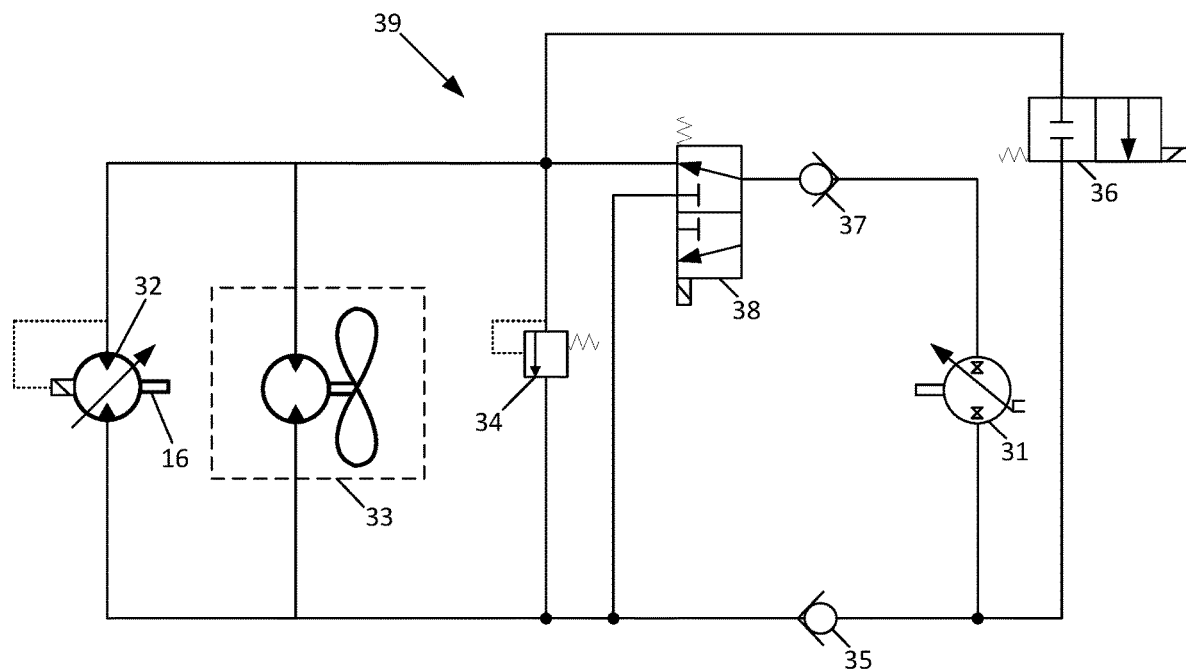
FIG. 2 shows a general hydraulic circuit includes hydraulic pump from PTO to power work equipment and a variable displacement hydraulic machine to vary the output torque. Note that the two directional valves are for forward and reserve propulsion shifting. Thus said hydraulic machine will be a pump during forward creeping drive and a motor in reverse drive.
Figure 2A:
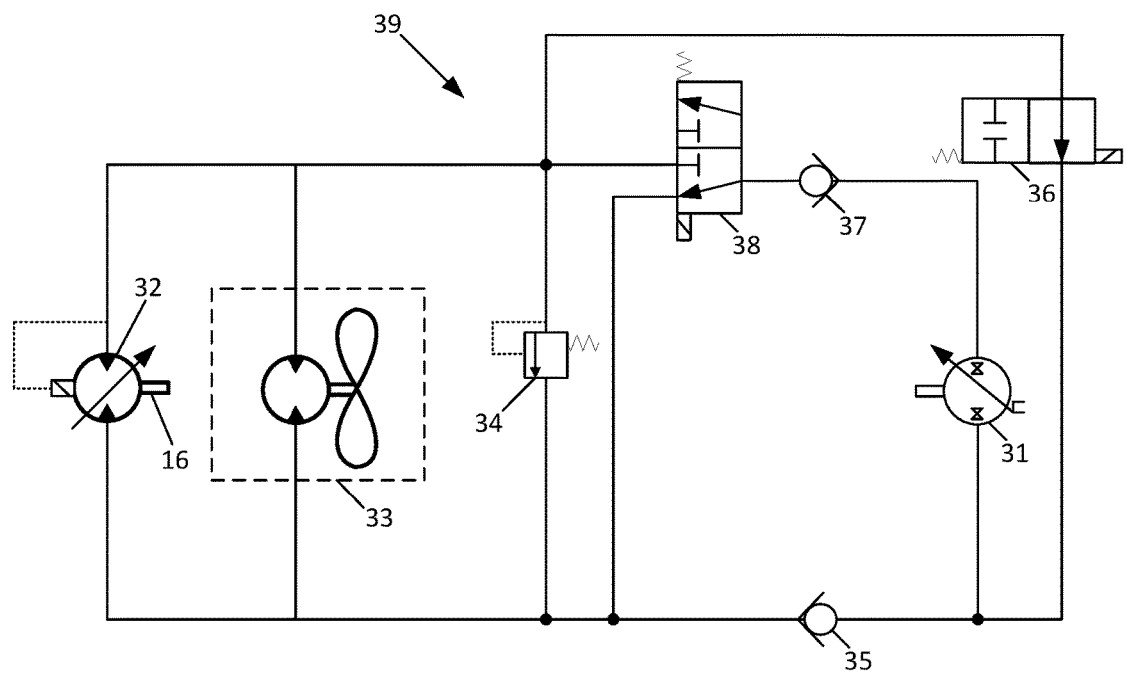
FIG. 2A shows the hydraulic circuit of FIG. 2 with the control valves moved to allow for a reverse drive of the vehicle.

Initially, while the sun gear 11a rotates as driven by ring gear 14, carrier 12 may not rotate until its torque reaches a balance with the sun gear 11a. The torque at the carrier is balanced from the road traction effect (i.e. from wheels 24, axle 23, axle reduction box 22, driveline 21 to shaft 9, coupler 7 and gears 8 and 10). Only after such torque resistance is overcome, will the carrier start to rotate and start to propel the vehicle. Notably, the sun gear 11a is externally connected to hydraulic work machine 31, which in this case is configured as a variable displacement hydraulic motor/pump. In the work mode, the hydraulic work machine functions as a pump when the vehicle is in the work mode. The hydraulic work machine 31 can join the work equipment system with substantially the same pressure, as shown in FIG. 2. In one aspect, the hydraulic work machine 31 has a displacement volume $q_s$ (in³/rev), wherein torque $T_s$ is defined by $$T_s = \eta_s p q_s / (2\pi) \tag{7}$$

wherein system pressure is p and $\eta_s$ efficiency factor of machine 31.

When maintaining the pressure relative the same but alternating the displacement volume of the hydraulic machine 31, which could be achieved by using the signal for acceleration pedal in the cab, for example, the torque will be changed accordingly. As a result, the output torque and speed of the hydraulic work machine 31 can be varied continuously.

Now if the operator presses down the acceleration pedal to increase the engine throttle, the torque in the ring gear 14 and hydraulic machine 31 (so thus the sun gear 11a) increases. As soon as the torque at the carrier 12 can overcome the resistance from the road, it will start to rotate. The resulting drive ratio can be varied continuously as the throttle and road condition changes, following the planetary gear governing equations described above.

Note that a novel feature of present disclosure is that the variable creep speed is achieved by using the hydraulic machine 31 as a pump instead of a hydraulic motor drive, and the machine 31 also generally contributes pressure flow to the work (sweeping) equipment during creep drive.

In addition, the volume size of the hydraulic machine in present disclosure could be significantly smaller than a motor required to propel a vehicle directly. As discussed before and shown in Equation (5), the hydraulic machine (a pump in this case), would be only 1/α in size. For example, when α ring gear teeth number/sun gear teeth number=2.4, it leads to $$1/\alpha = 1/2.4 = 0.417 \tag{8}$$

which means the size of hydraulic machine 31 would be only 41.7% of a direct drive motor.

Furthermore, as the engine power distributed mechanically between the propulsion and sweeping or like working functions, no negative power recirculation is present. This power splitting system is thus highly efficient.

The adaption of the present disclosure to an on-highway chassis is straightforward. In 'working (sweeping)' mode, it is simply to set the engine to a higher 'ideal' speed to meet the power demand from work equipment which could be substantially higher than normal ideal. In the meantime, the proper gear ratio at the transmission 2 is selected to meet with the speed and torque requirements. The above can be easily achieved through chassis programming and turned on by a switch by the vehicle operator.

An additional modification can be using the acceleration pedal signal to alternate the operation of the hydraulic machine 31. Nowadays on-highway chassis is commonly equipment with computer control modules, such a signal is readily available from CAM BUS. The mechanism is to change the work machine displacement, so thus the torque, according to the acceleration pedal signal inside the cab. As a result, driving the vehicle in 'work (sweep)' mode is very much the same as a standard vehicle for the operator.

At the PTO, a hydraulic pump 32 is normally attached, as can be seen at FIG. 2. In some applications, it is desirable for the hydraulic pump 32 to be a pressure-compensated variable displacement pump, so that when the chassis transmission speed becomes too high, the displacement volume will be automatically reduced to maintain a preset pressure. FIG. 2 shows an exemplary closed hydraulic work circuit 39 for powering the work functions of the vehicle 29. As shown, the work circuit includes the hydraulic work machine 31 and the hydraulic pump 32. The work circuit 39 can also include rotary powered equipment units 33. Examples of such equipment 33 are hydraulic motors that power brooms, conveyors, fans, and vacuum pumps. The closed hydraulic work circuit can also include a relieve valve 34, check valves 35, 37, and control valves 36, 38 to ensure proper operation of the work circuit. The position of the control valves can be controlled by an electric or electronic actuator in communication with either the vehicle controller or a specialized controller for the work system.

Occasionally, there are needs to propel a vehicle reversely during the working (sweeping) process. The disclosed system addresses this function by simply switching the hydraulic machine 31 from pump to motor status, without shifting away from the 'working (sweeping)' mode. This can be accomplished by activating the two directional valves 36 and 38 to the position shown in FIG. 2A. The propulsion speed control in reverse is thus very much the same as creeping forward. Note that the working equipment performance would be affected by the change of hydraulic machine 31 from pump to motor, but, fortunately, such a reverse is usually short time and will not impact the working performance too much. As a matter of fact, such as in a street sweeper application, it is sometimes required to shut down the broom sweeping functions during reserve to avoid possible damage to the equipment.

It appears that the disclosed approach will be very beneficial to provide a solution to single engine street sweeper or like specialty vehicle where no extra motor or hybrid drive is required. Thus it will provide a solution for more fuel efficient and environmental friendly, easy to operate and maintain, and lower manufacturing and ownership cost.

Although the disclosed examples have been shown and described with respect preferred embodiments thereof, it should be understood by those skilled in the art that various changes and omissions, such as using the ring gear or sun gear instead of the carrier as the input shaft, in the form and detail thereof may be made therein without departing from the spirit and the scope of the disclosure. It should also be appreciated that the exemplary embodiments are examples only, and are not intended to limit the scope, applicability, or configuration of the disclosure in any way.

What is claimed:
1. A vehicle comprising:
a chassis assembly including an engine, a transmission, and a drive wheel axle, wherein the transmission is operably connected to the drive wheel axle; and
a power split drive system located between the transmission and the drive wheel axle, the power split drive system including:

a first power input shaft operably connected to the transmission;

a first power output shaft operably connected to a first machine, wherein the first machine includes a motor and a first drive device;

a second power output shaft operably connected to the drive wheel axle;

a third power output shaft operably connected to a second machine and the first power input shaft, wherein the second machine includes a second drive device;

a planetary gear set interconnecting the first power input shaft with the first and second power output shafts; and a circuit including the first machine and the second machine, wherein the vehicle is operable between:

a transport mode in which the power split drive system is disengaged such that all power from the transmission is directed to the drive wheel axle; and a work mode in which the power split drive system is engaged such that power can be selectively distributed from the transmission to the drive wheel axle and to the first machine operating as a first drive device, wherein the work mode includes a reverse drive mode in which the first machine operates as a motor driven by the second drive device of the second machine associated with the third power output shaft.

2. The vehicle of claim 1, wherein the first machine includes a hydraulic motor and a first hydraulic pump, the second machine includes a second hydraulic pump, and the circuit is a hydraulic work circuit.

3. The vehicle of claim 1, further comprising a coupler assembly configured to change the vehicle between the transport mode and the work mode, and wherein in the work mode, the power from the transmission simultaneously drives both the first power output shaft and the second power output shaft.

4. The vehicle of claim 3, wherein in the work mode power from the transmission dives the third power output shaft.

5. The vehicle of claim 1, wherein the planetary gear set comprises a sun gear connected to the first power output shaft.

6. The vehicle of claim 1, wherein the first machine is a variable torque device.

7. The vehicle of claim 1, wherein the vehicle is a single engine street sweeper.

8. A vehicle comprising:

a chassis assembly including an engine and a driveline including axles and wheels;

a power circuit to perform work functions, wherein the power circuit includes a machine;

a power split drive system with a transmission mechanically connecting the engine to the power circuit and the driveline, wherein the power split drive system includes:

an input component with a shaft joining to the engine;

a port to provide power for work equipment; and at least one planetary gear set including:

a first output component with a shaft connecting to the machine configured to provide power to the power circuit from the input component; and a second output component with a shaft connecting and providing power to the driveline from the input component; and a control system to manage the machine, wherein power from the engine can be selectively distributed between the power circuit and the driveline, wherein the machine operates as a drive device in a work mode during forward propulsion of the vehicle such that power is provided by the machine to drive the work equipment, and wherein the machine operates as a motor in reverse propulsion of the vehicle to drive the vehicle.

9. The vehicle of claim 8, wherein the machine includes a hydraulic motor and a hydraulic pump.

10. The vehicle of claim 8, wherein the machine is a variable torque device.

11. The vehicle of claim 8, wherein the control system communicates with chassis engine control modules and controls the machine to vary a torque of the machine in response to an acceleration pedal signal inside a vehicle cab.

12. The vehicle of claim 8, wherein the at least one planetary gear set comprises a sun gear connected to the first output component.

13. The vehicle of claim 8, further comprising a coupler assembly configured to change the vehicle between the work mode and a transport mode, and wherein in the work mode, the power from the transmission simultaneously drives both the first output component and the second output component.

14. The vehicle of claim 8, wherein the vehicle is a single engine street sweeper.

* * * * *